(No Model.)

J. H. LANDES.
PUZZLE.

No. 601,811. Patented Apr. 5, 1898.

Witnesses:
H. B. Hallock.
R. M. Pierce

Inventor:
Jacob H. Landes
by J. J. Williamson
Attorney.

UNITED STATES PATENT OFFICE.

JACOB H. LANDES, OF GRATER'S FORD, PENNSYLVANIA.

PUZZLE.

SPECIFICATION forming part of Letters Patent No. 601,811, dated April 5, 1898.

Application filed November 19, 1897. Serial No. 659,121. (No model.)

*To all whom it may concern:*

Be it known that I, JACOB HERBERT LANDES, a citizen of the United States, residing at Grater's Ford, in the county of Montgomery and State of Pennsylvania, have invented a new and useful Improvement in Puzzles, of which the following is a full, clear, and exact specification.

My invention relates to a new, interesting, and instructive puzzle; and it consists of a series of blocks of such shape that when they are properly placed together they will produce the outlines of two or more figures, and when these blocks are properly painted, lithographed, or otherwise inscribed they will produce a picture of the figure intended to be represented.

Figure 1:
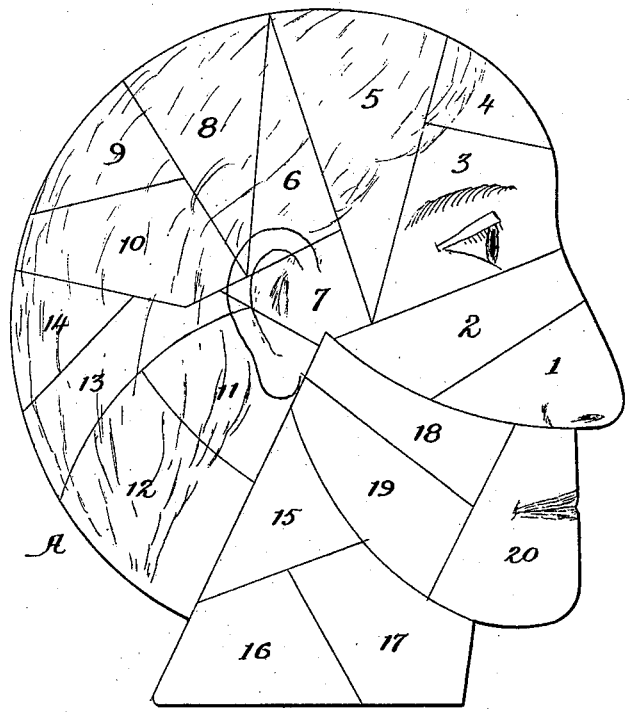
Figure 2:
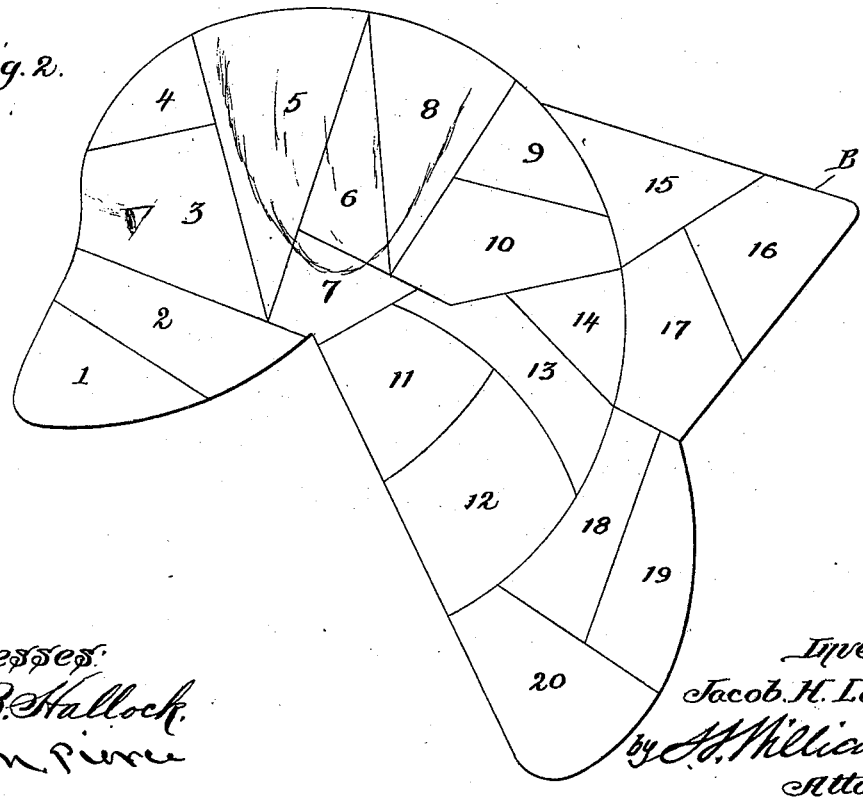

In the drawings forming a part of this specification, Figure 1 shows the blocks arranged so as to produce the representation of a human head, while Fig. 2 shows the rearrangement of the blocks so as to produce a dog's head.

In carrying out my invention as here embodied, A represents the side of the blocks which is to be turned upward when the human head is to be represented, and for convenience these blocks may be numbered; but, of course, it will make the puzzle far more difficult to solve by omitting the numbers, so that the manipulator has only the design for guidance. The same blocks when rearranged with their reverse sides, as indicated by B, will produce the representation of a dog's head, as clearly shown in Fig. 2, so that it is obvious that considerable interest may be aroused in the solving of the puzzle, while at the same time instruction will be imparted to the person undertaking the solution thereof and the outline of the figures produced will be impressed upon the mind, thus serving as an educational device for young persons. These blocks may be placed within a box of proper shape to contain them in their assembled position or in a box of ordinary shape for ease in shipping. A further complication of the puzzle may be had by so forming them that their figures may be produced by the rearrangement thereof.

In the manufacture of my puzzle care must be taken that the outlines thereof shall be such that they will match up in the formation of the different figures without leaving rugged or uncouth projections.

The blocks are here numbered in order to show the arrangement and rearrangement thereof necessary to produce the two figures.

The blocks may be made of any desired thickness and of any desired material; but I prefer that they be made of wood.

Having thus fully described my invention, what I claim is—

A puzzle, consisting of a series of different-shaped blocks adapted to be arranged and rearranged to form the outline of two or more figures, said blocks having various features printed on each side thereof, whereby in one arrangement one figure will be represented and by a reversal and a different arrangement another figure will be represented, said blocks being numbered so that by placing adjacent blocks so as to have consecutive numbers aid will be given in the formation of the figures, substantially as shown and described.

In testimony whereof I have hereunto affixed my signature in the presence of two subscribing witnesses.

JACOB H. LANDES.

Witnesses:
FANNIE L. ROBERTS,
EUGENE D. EGBERT.